US012659439B2

(12) United States Patent
Shen et al.

(10) Patent No.: US 12,659,439 B2
(45) Date of Patent: Jun. 16, 2026

(54) IMAGE RECOGNITION SYSTEM AND TRAINING METHOD THEREFOR

(71) Applicant: REALTEK SEMICONDUCTOR CORP., Hsinchu (TW)

(72) Inventors: Wei-Hsiang Shen, Hsinchu (TW);
Kai-Chun Su, Hsinchu (TW);
Tsung-Hsuan Li, Hsinchu (TW);
Chao-Hsun Yang, Hsinchu (TW);
Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 539 days.

(21) Appl. No.: 17/716,554

(22) Filed: Apr. 8, 2022

(65) Prior Publication Data

US 2023/0156167 A1     May 18, 2023

(30) Foreign Application Priority Data

Nov. 9, 2021     (TW) ................................. 110141729

(51) Int. Cl.
*H04N 9/64*          (2023.01)
*G06T 7/73*          (2017.01)
          (Continued)

(52) U.S. Cl.
CPC ................ *H04N 9/64* (2013.01); *G06T 7/74* (2017.01); *G06T 7/90* (2017.01); *G06V 10/56* (2022.01);
          (Continued)

(58) Field of Classification Search
CPC .... G06V 10/7747; G06V 10/56; G06V 10/82; H04N 9/64; H04N 5/33; H04N 9/43;
          (Continued)

(56) References Cited

U.S. PATENT DOCUMENTS 11,948,357 B2 * 4/2024 Landy .................... G06V 20/41
2011/0286665 A1 * 11/2011 Umeda ................ H04N 1/6086
                                                382/167
(Continued)

FOREIGN PATENT DOCUMENTS

CN          102237025 B       8/2013
CN          106124061 A  * 11/2016  ................ G01J 5/00
          (Continued)

OTHER PUBLICATIONS

Takumi et al., Multispectral Object Detection for Autonomous Vehicles, Proceedings of the on Thematic Workshops of ACM Multimedia 2017; Total 4 pages (Year: 2017).*
          (Continued)

*Primary Examiner* — Stephen R Koziol
(74) *Attorney, Agent, or Firm* — Birch, Stewart, Kolasch & Birch, LLP

(57)          ABSTRACT

An image recognition system includes a color conversion module and a target recognition module. The color conversion module is configured to convert a gray-level image into a preset color image according to a conversion function. The target recognition module includes a machine learning algorithm, and the machine learning algorithm includes a plurality of functions and a plurality of parameters. The machine learning algorithm receives the preset color image, and outputs a recognition result according to the functions and the parameters, the recognition result including an existent target or a null target.

12 Claims, 8 Drawing Sheets
(4 of 8 Drawing Sheet(s) Filed in Color)

(51) Int. Cl.

| | |
|---|---|
| *G06T 7/90* | (2017.01) |
| *G06V 10/56* | (2022.01) |
| *G06V 10/774* | (2022.01) |
| *H04N 5/33* | (2023.01) |

(52) U.S. Cl.

CPC ........... *G06V 10/7747* (2022.01); *H04N 5/33* (2013.01); *G06T 2207/10024* (2013.01); *G06T 2207/10048* (2013.01); *G06T 2207/20081* (2013.01); *G06T 2207/20084* (2013.01); *G06V 2201/07* (2022.01)

(58) Field of Classification Search

CPC ............. G06T 7/90; G06T 2207/10024; G06T 11/001; G06T 2207/10048; G06T 2207/10116; G06T 2207/10132

See application file for complete search history.

(56) References Cited

U.S. PATENT DOCUMENTS

| | | | | |
|---|---|---|---|---|
| 2014/0294237 A1* | 10/2014 | Litvak | ..................... | G06T 7/521 |
| | | | | 382/103 |
| 2018/0075589 A1* | 3/2018 | Winzell | ................. | G06T 11/001 |
| 2020/0211257 A1* | 7/2020 | Moltaji | ................... | G06T 11/10 |
| 2020/0294278 A1* | 9/2020 | Watanabe | ............. | G06T 7/0012 |
| 2021/0366087 A1* | 11/2021 | Du | ........................ | G06V 10/764 |
| 2023/0064963 A1* | 3/2023 | Shang | .................. | H04N 1/6047 |

FOREIGN PATENT DOCUMENTS

| | | | |
|---|---|---|---|
| KR | 10-2021-0082724 A | 7/2021 |
| TW | I611374 B | 1/2018 |

OTHER PUBLICATIONS

Godin, F., Degrave, J., Dambre, J., & Neve, W.D. (2017). Dual Rectified Linear Units (DReLUs): A Replacement for Tanh Activation Functions in Quasi-Recurrent Neural Networks. arXiv:1707. 08214v2. (Year: 2017).*

Y. Yang, P. Yuhua and L. Zhaoguang, "A Fast Algorithm for YCbCr to RGB Conversion," in IEEE Transactions on Consumer Electronics, vol. 53, No. 4, pp. 1490-1493, Nov. 2007, doi: 10.1109/TCE. 2007.4429242 (Year: 2007).*

Obowu, C. D., Abam, T. K., & Ngah, S. (2019). Qualitative SAR Dark Spot Analysis for Oil Anomaly Characterization. European Journal of Applied Sciences, 7(5), 22-29. https://doi.org/10.14738/ aivp.75.7240 (Year: 2019).*

Lode Vandevenne, Lode's Computer Graphics Tutorial: Light and Color, Nov. 12, 2020. https://web.archive.org/web/20201112041531/ https://lodev.org/cgtutor/color.html#expand (Year: 2020).*

Bochkovskiy et al., "YOLOv4: Optimal Speed and Accuracy of Object Detection", arXiv:2004.10934v1 [cs.CV] Apr. 23, 2020, pp. 1-17.

Shorten et al., "A survey on Image Data Augmentation for Deep Learning", Journal of Big Data, 2019, pp. 1-48.

Takumi et al., Multispectral Object Detection for Autonomous Vehicles, Proceedings of the on Thematic Workshops of ACM Multimedia 2017; Total 4 pages.

* cited by examiner

IMAGE RECOGNITION SYSTEM AND TRAINING METHOD THEREFOR

CROSS-REFERENCE TO RELATED APPLICATION

This non-provisional application claims priority under 35 U.S.C. § 119(a) to Patent Application No. 110141729 filed in Taiwan, R.O.C. on Nov. 9, 2021, the entire contents of which are hereby incorporated by reference.

BACKGROUND

Technical Field

The present invention relates to an image recognition system and a training method therefor, and in particular, to a gray-level image recognition system and a training method therefor.

Related Art

Object detection is an important technology in the field of computer vision, and is to detect and classify objects in an image.

Before implementing object detection through a machine learning algorithm, a developer needs to collect a large quantity of images, manually mark the location or category of a target object in each image, and then train a neural network by using the marked images. For color images, there are currently a large quantity of public image databases that can provide marked color images.

However, for gray-level images such as infrared images, relevant image data inventory is rare. Therefore, the developer needs to spend a lot of manpower on marking gray-level images, or improve hyperparameter settings such as a quantity of hidden layers, a quantity of channels, or a width of the neural network. Consequently, a loss of a large quantity of system computing resources is caused, and the recognition capability of the neural network is still limited.

SUMMARY

In view of this, the inventor provides an image recognition system and a training method therefor. The image recognition system includes a color conversion module and a target recognition module. The color conversion module is configured to convert a gray-level image into a preset color image according to a conversion function. The target recognition module includes a machine learning algorithm, where the machine learning algorithm includes a plurality of functions and a plurality of parameters, the machine learning algorithm receives the preset color image, and outputs a recognition result according to the functions and the parameters, the recognition result including an existent target or a null target.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
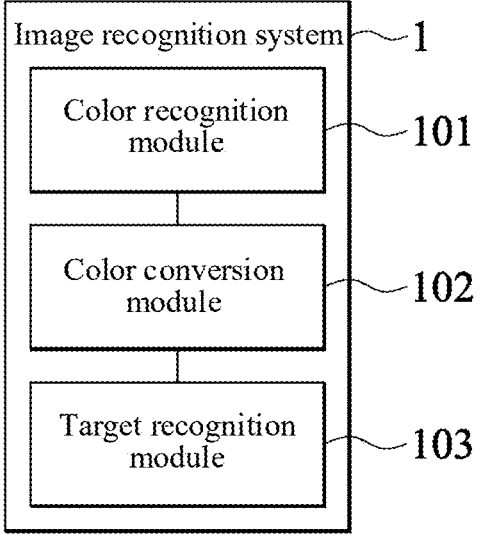
FIG. 1 is a schematic block diagram of an image recognition system according to some embodiments.
Figure 2:
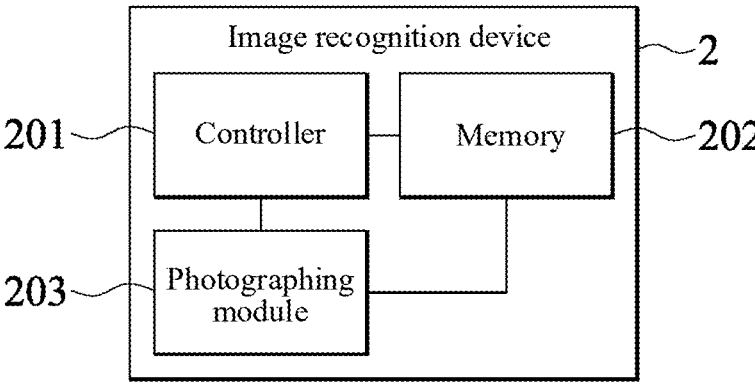
FIG. 2 is a schematic block diagram of an image recognition device according to some embodiments.

FIG. 1 is a schematic block diagram of an image recognition system according to some embodiments. FIG. 2 is a schematic block diagram of an image recognition device according to some embodiments. According to some embodiments, an image recognition system 1 includes a color recognition module 101, a color conversion module 102, and a target recognition module 103.

The image recognition system 1 may be software executed by a computing device or a mobile device such as a personal computer, a server, a tablet, or a mobile phone, or firmware of an image capture device such as a camera, a video camera, or a monitor. The image recognition system 1 may be stored in a storage device such as a memory, a hard disk, a USB flash drive, a memory card, and an optical disc, and may be read by a controller of a proximal device, or be read by a controller of a remote device through a network. The memory may be, but is not limited to, any one or a combination of a static random access memory (SRAM), an instruction register, an address register, a general-purpose register, a flag register, and a cache memory. A controller 201 may be implemented by using a component such as an SoC chip, a central processing unit (CPU), a microcontroller unit (MCU), or an application-specific integrated circuit (ASIC).

Referring to FIG. 2, according to some embodiments, an image recognition device 2 includes a controller 201, a memory 202, and a photographing module 203. The image recognition system 1 may be stored in the memory 202, and may be read by the controller 201. When executing the image recognition system 1, the controller 201 may receive image data captured by the photographing module 203, or read image data stored in the memory 202. The photographing module 203 may be a thermal imager, a night vision device, an infrared camera, or a photographing module 203 that can provide a gray-level photography mode. The image data may be a color image or a gray-level image, the color image may include brightness (also referred to as lightness), a hue, chrominance (also referred to as chroma, or saturation), and other information, and the gray-level image may include brightness information. According to some embodiments, after capturing an image, the photographing module 203 may separately store the color image or the gray-level image as files with different formats, or store distinction parameters in file content. According to some embodiments, the controller 201 controls the photographing module 203 to execute a color photography mode or an infrared photography mode, and executes the image recognition system 1 according to photographing parameters corresponding to the photography modes. For example, for a bitmap (bmp) format file, the gray-level image is stored as a pixel format of pf8 bit, and the color image is stored as a pixel format of pf16 bit.

According to some embodiments, the color recognition module 101 receives the image data, and determines whether the image data is the gray-level image according to the image data or a photographing parameter. For example, a pixel format of the image data is determined or whether RGB values of pixels in the image are null or all equal is determined. For example, whether the image data is the gray-level image is determined according to a photographing parameter of a photography mode when the photographing module 203 photographs the image data. The photographing parameter may be generated by the controller 201 of the photographing module 203 and be directly inputted into the image recognition system 1, or be additionally stored in an image file or an independent file, and then be read by the image recognition system 1. The color recognition module 101 transmits the gray-level image to the color conversion module 102, to perform subsequent processing. According to some embodiments, the color recognition module 101 determines that the image data is not the gray-level image (i.e., a color image), and transmits the image data to the target recognition module 103, to perform subsequent processing. Therefore, according to some embodiments, the color recognition module 101 classifies different image data to facilitate optimization of the gray-level image, to improve the recognition capability of the target recognition module 103.

The color conversion module 102 is configured to convert the gray-level image into a preset color image according to a conversion function. According to some embodiments, the preset color image refers to pixels with the same brightness in the image data, and chrominance values (for example, red chrominance, blue chrominance, or green chrominance in an RGB color space) among the pixels are also the same. Under the same brightness, chrominance values outputted by conversion functions of different hues may be different. According to some embodiments, the preset color image means that when brightness of pixels is 0, the chrominance thereof is also 0 (which shows black); and when the brightness of pixels is 255, the chrominance thereof is also 255 (which shows white). Therefore, the conversion function may convert the brightness of the gray-level image into the chrominance of the preset color image, and the color shown by the preset color image may be a mixture of a plurality of hues with the same or different chrominance values. Embodiments related to the conversion function are described below in detail.

The target recognition module 103 includes a machine learning algorithm, and the machine learning algorithm may be an object detection model, which is adapted to receive the image data and output a recognition result. The machine learning algorithm may perform image classification or recognition by using a convolutional neural network (CNN) model, to find a target object in an image, or perform classification or recognition of image sequences by using a recurrent neural network (RNN) model, a long short-term memory (LSTM) model, or the like.

The machine learning algorithm includes an input layer, a hidden layer, and an output layer. The input layer may include a plurality of input ports and neurons, to receive a plurality of features, for example, capture features of the image, such as, a contour, a border, a corner, and brightness. Neurons of the hidden layer are connected to the neurons of the input layer, and neurons of the output layer or other hidden layers. An activation function and hyperparameters of the neurons may be preset during training, for example, a quantity of neurons of the hidden layer, an initial weight, an initial deviation, and a learning rate are preset. A weight, a deviation value, and another parameter of each neuron may alternatively be adjusted during training. Each neuron receives a plurality of input values, and after being multiplied by the weight and added with the deviation, the input values are summed up and are outputted through the activation function. In response to different models, the parameters include weights set by functions of the neurons, for example, a weight of a hidden layer in the CNN model, or weights of functions such as an input gate, an output gate, or a forget gate used for updating a state in the LSTM model. The output layer outputs a recognition result. The recognition result may be a probability whether the image includes a target object, or a probability that the target object is located at specific coordinates on the image. The recognition result may alternatively be an existent state of the target object or the coordinates of the target object outputted after threshold selection on a probability value. The foregoing parameters such as the weight and the deviation value, and model settings such as a model type, a quantity of hidden layers, and the activation function may be stored after the model is trained, to be read by the controller 201 of the image recognition device 2 in the future, or provided to another computing device to execute the image recognition system 1.

For example, the target object of the machine learning algorithm is set as a puppy. When a photo of a shepherd dog is inputted, the recognition result may be a logical value of the puppy in the photo (an existent target, for example, "1"), or be a probability that the shepherd dog is located at a specific position in the photo (the existent target), and the shepherd dog may be selected by a method such as the threshold selection. When a video including a shepherd dog is inputted, the recognition result may be a logical value of the puppy in the entire video (the existent target, for example, "1"), or be a probability that the shepherd dog is located at a specific position in each image frame of the video (the existent target). On the contrary, when a landscape photo is inputted, the recognition result may be a logical value of the puppy not in the photo (a null target, for example, "0" or "null").

The machine learning algorithm may receive the preset color image, to enhance the distinction capability of the target object in the image. According to some embodiments, the machine learning algorithm may alternatively receive an original color image, for example, image data including RGB chrominance information when a camera stores information, to perform object detection on various data such as the preset color image (converted from the gray-level image) and the original color image.

In conclusion, the image recognition system 1 converts the gray-level image into the preset color image, to provide the preset color image to the machine learning algorithm for the object detection, thereby resolving a problem of low accuracy of object recognition due to lack of color, low contrast, and blurred details in the gray-level image when the object detection is directly performed on the gray-level image, or resolving problems such as a loss of a large quantity of computing resources, increased hardware costs, or increased labor costs for marking training images, which are resulted from increasing training scales or training samples to improve the recognition capability. Therefore, the image recognition system 1 is allowed to be applied to a camera chip with conventional computing performance, to reduce the production costs and improve the object recognition speed.

Figure 3:
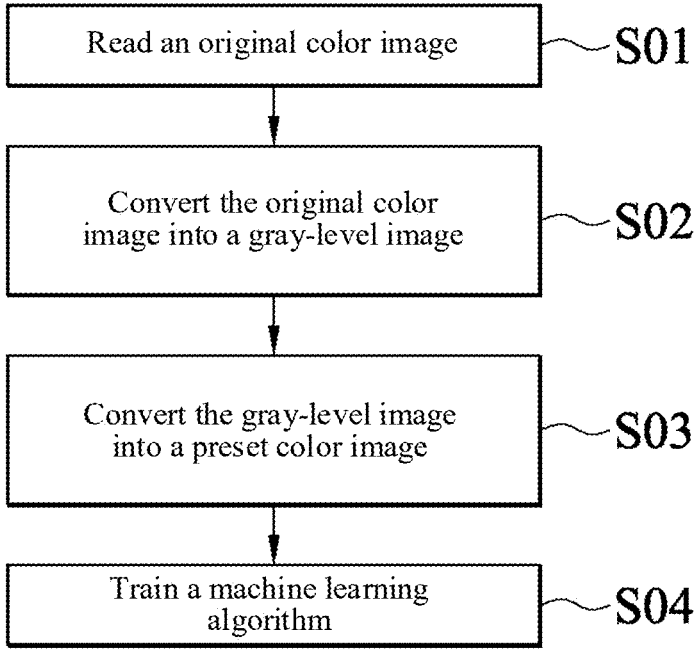
FIG. 3 is a flowchart of training a machine learning algorithm according to a first embodiment.

FIG. 3 is a flowchart of training a machine learning algorithm according to a first embodiment. A color conversion module 102 reads an original color image (step S01), and converts the original color image into a gray-level image (step S02). The method may be obtaining a large quantity of marked original color images from public databases, and converting the images into gray-level images, to simulate a gray-level image photographed by an infrared camera. Then, the gray-level image is converted into a preset color image (step S03), and forms a training set together with training tags marked in images, to train a state of a machine learning algorithm (step S04). The training may refer to training and generating a model according to a group of image data as input and training tags as output; or, updating a weight state of an existing model by using, for example, backward propagation according to another group of image data and training tags or according to a loss of model output and real values.

Figure 4:
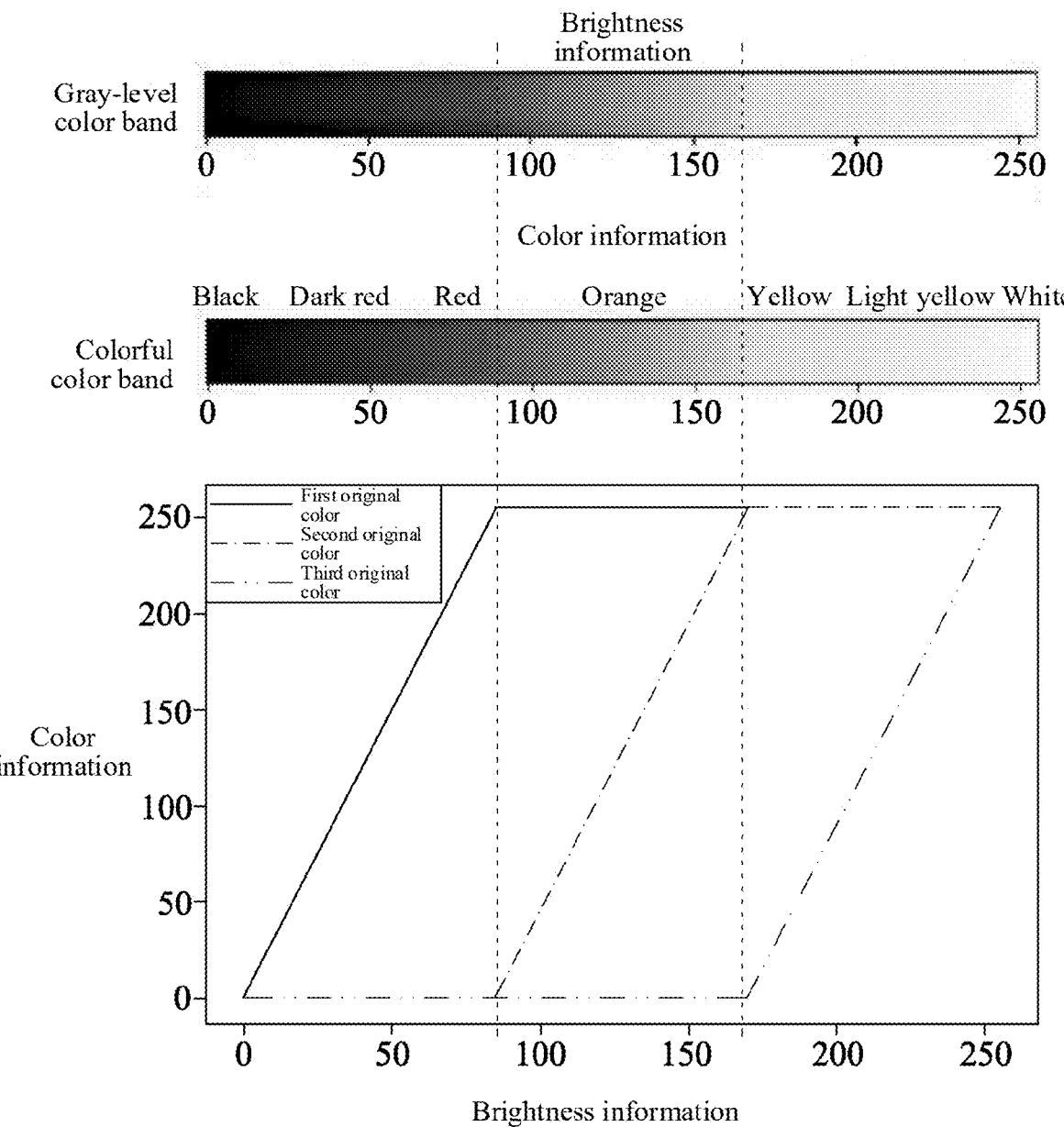
FIG. 4 is a schematic diagram of preset color conversion according to some embodiments.

FIG. 4 is a schematic diagram of preset color conversion according to some embodiments. A gray-level color band diagram at the top of FIG. 4 shows a change of brightness of a single pixel of a gray-level image, with a value range of 0 to 255; a colorful color band diagram in the middle of FIG. 4 shows a color change of a single pixel of a preset color image; and a line diagram at the bottom of FIG. 4 shows chrominance changes of three hues: a first original color (represented by a solid line), a second original color (represented by a single-dot chain line), and a third original color (represented by a double-dot chain line), where a horizontal axis of the line diagram corresponds to a brightness value of the single pixel of the gray-level image, and a vertical axis corresponds to a chrominance value of any hue of the single pixel of the preset color image. According to some embodiments, the brightness ($I_{brightness}$) of the single pixel of the gray-level image may be converted into chrominance of the hues of the single pixel of the preset color image according to the following formulas 1-1, 1-2, and 1-3, and be summed up according to the formula 2:

$$I_R = f(W_R \times I_{brightness} + b_R) \qquad \text{(formula 1-1)}$$

$$I_G = f(W_G \times I_{brightness} + b_G) \qquad \text{(formula 1-2)}$$

$$I_B = f(W_B \times I_{brightness} + b_B) \qquad \text{(formula 1-3)}$$

$$I_{RGB} = I_R + I_G + I_B \qquad \text{(formula 2)}$$

where, $W_R$ is a red weight, $W_G$ is a green weight, $W_B$ is a blue weight, $b_R$ is a red offset, $b_G$ is a green offset, $b_B$ is a blue offset, and $f(\ )$ is a limited output function. A weight value of any hue affects a slope of the hue line diagram. The larger the weight value, the faster the chrominance value of the hue reaches saturation (i.e., a value 255). The offset affects an order of the hue line diagram. The greater an absolute value of a negative offset, the later the chrominance value of the hue starts to be increased. The limited output function limits an input value to be in the range of 0 to 255, where a value lower than 0 is specified as 0, and a value higher than 255 is specified as 255.

To facilitate understanding of the formula 1-1 to the formula 1-3, refer to the line diagram at the bottom of FIG. 4. By using an example in which the first original color of FIG. 4 is red, if $W_R$ is 3 and $b_R$ is 0, a red chrominance value starts to be increased when a brightness value is 0, and when the brightness value reaches 85 (i.e., 255/3), the red chrominance value reaches a saturation value 255. Therefore, a value of a brightness range of 0 to 85 of the original gray-level image is amplified as a value of a red chrominance range of 0 to 255. In other words, when the brightness value is increased from 0 to 1, the red chrominance value is increased from 0 to 3, thereby increasing contrast among pixels of the image.

The weight values and offsets may be set according to requirements, thereby affecting contrast changes of different brightness ranges. For example, to increase contrast among brightness values 50 to 100, a weight value of the first original color may be set to 5.1 (i.e., 255/50), and an offset is set to −255, so that brightness is converted into chrominance of 5.1 times. For example, to increase the contrast among brightness values 50 to 100 and contrast among brightness values 150 to 200, the weight value of the first original color is set to 5.1 (i.e., 255/50), and the offset is set to −255; and a weight value of the second original color is set to 5.1 (i.e., 255/50), and an offset is set to −3*255. Therefore, the conversion function can enhance contrast of specific brightness ranges (for example, a darker or brighter brightness range), to improve the recognition capability of the image recognition system 1 in these ranges. According to some embodiments, the image recognition system 1 may adaptively adjust the weight values and offsets of the conversion function according to brightness information of the image data. For example, at midnight, the image recognition system 1 increases a function weight corresponding to a low-brightness range according to time or according to lower brightness of all pixels of the image data (for example, average brightness is lower than a threshold); and at early morning, the image recognition system 1 reduces the function weight corresponding to the low-brightness range and increases a function weight corresponding to a high-brightness range according to the time or according to improved brightness of all pixels of the image data (for example, the average brightness is higher than a threshold).

According to some embodiments, to increase contrast of an entire value range of the brightness information on average, in a case of using the RGB color space, the red weight $W_R$, the green weight $W_G$, and the blue weight $W_B$ may be set to 3, and differences among offsets of the three original colors are set to 255. Therefore, the line diagram illustrated in FIG. 4 is shown: a value range of 0 to 85 of the brightness information is converted by the conversion function into a value range of 0 to 255 of color information of the first original color; a value range of 85 to 170 of the brightness information is converted by the conversion function into a value range of 0 to 255 of color information of the second original color; and a value range of 170 to 255 of the brightness information is converted by the conversion function into a value range of 0 to 255 of color information of the third original color. Therefore, the brightness information is equally divided into three groups of data and is amplified three times, and then is stored in the chrominance information of the three groups of hues. In this way, the recognition capability of the image recognition system 1 to the entire brightness range is improved.

According to the formula 2, the formula 1-1, the formula 1-2, and the formula 1-3, outputted red color information $I_R$, green color information $I_G$, and blue color information $I_B$ are summed up, to obtain color information $I_{RGB}$ of the RGB color space. Referring to the line diagram at the bottom of FIG. 4, it is assumed that the first original color is red, the second original color is green, and the third original color is blue. When a brightness value of the gray-level image is 0, color information of hues is also 0, and therefore, a colorful color band shows black; when the brightness value of the gray-level image is 85, red color information is 255, and color information of other hues is 0, and therefore, the colorful color band shows red; when the brightness value of the gray-level image is 170, the red color information and green color information are 255, and blue color information is 0, and therefore, the colorful color band shows yellow (in which red and green are mixed); and when the brightness value of the gray-level image is 255, all color information is 255, and therefore, the colorful color band shows white (in which red, green, and blue are mixed).

Figure 5A:
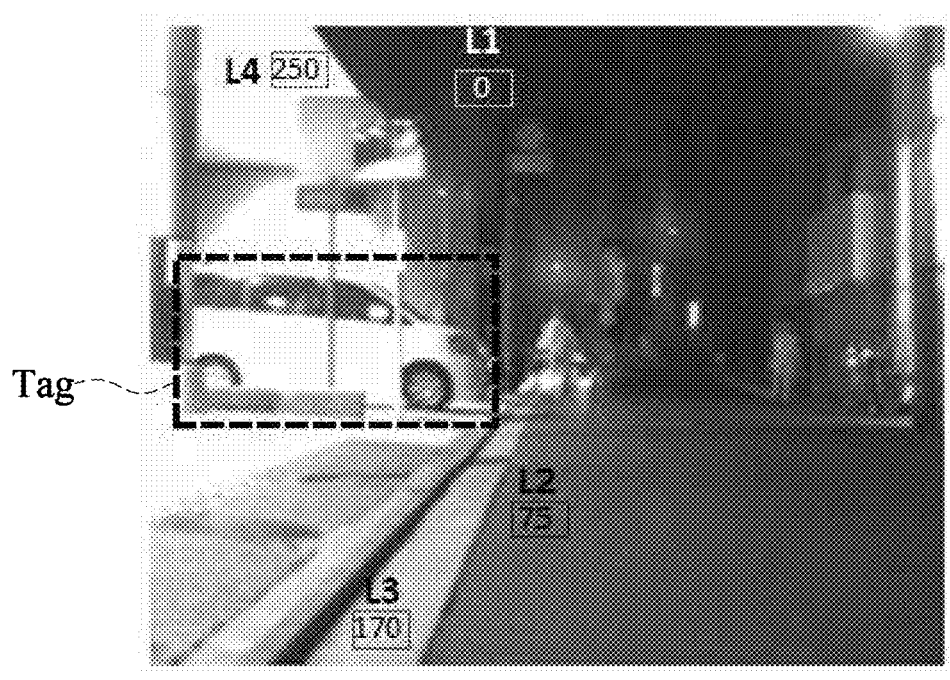
FIG. 5A is a schematic diagram of a gray-level image according to some embodiments.
Figure 5B:
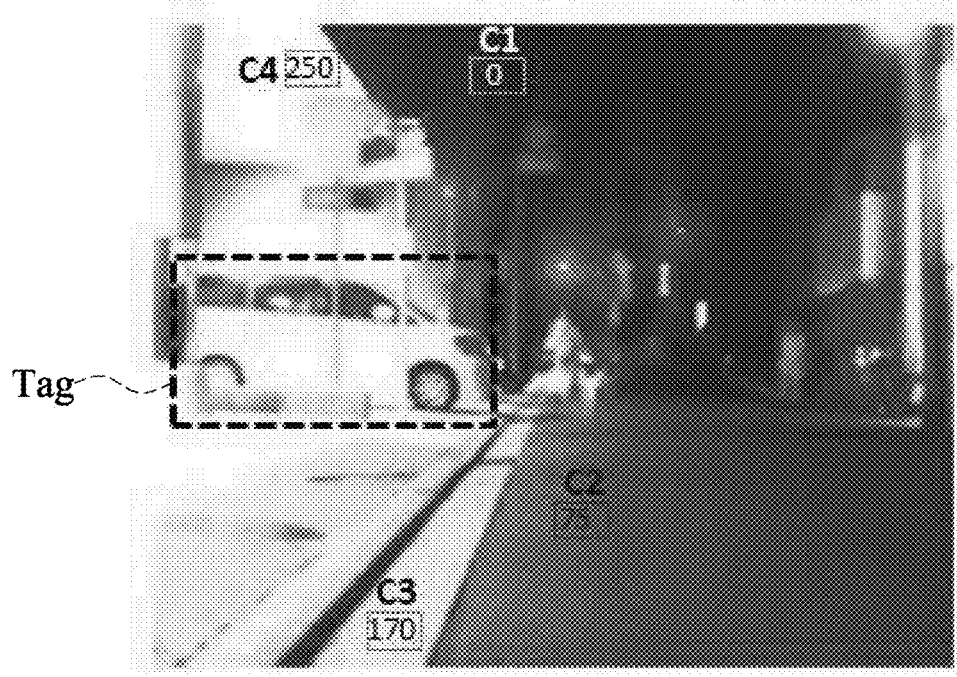
FIG. 5B is a schematic diagram of a preset color image according to some embodiments.

FIG. 5A is a schematic diagram of a gray-level image according to some embodiments. FIG. 5B is a schematic diagram of a preset color image according to some embodiments. Referring to FIG. 4 as a supplement together with FIG. 5A and FIG. 5B, brightness of a gray-level pixel L1 of FIG. 5A is 0, and a color of a corresponding preset color pixel C1 of FIG. 5B is black; brightness of a gray-level pixel L2 of FIG. 5A is 75, and a color of a corresponding preset color pixel C2 of FIG. 5B is dark red; brightness of a gray-level pixel L3 of FIG. 5A is 170, and a color of a corresponding preset color pixel C3 of FIG. 5B is yellow; and brightness of a gray-level pixel L4 of FIG. 5A is 250, and a color of a corresponding preset color pixel C4 of FIG. 5B is white. According to some embodiments, by using the foregoing conversion formulas, the gray-level image is converted into a preset color image with improved contrast, so that details on the image (for example, details such as car wheels, pedestrians, road signs in FIG. 5B) are more obvious.

Figure 6:
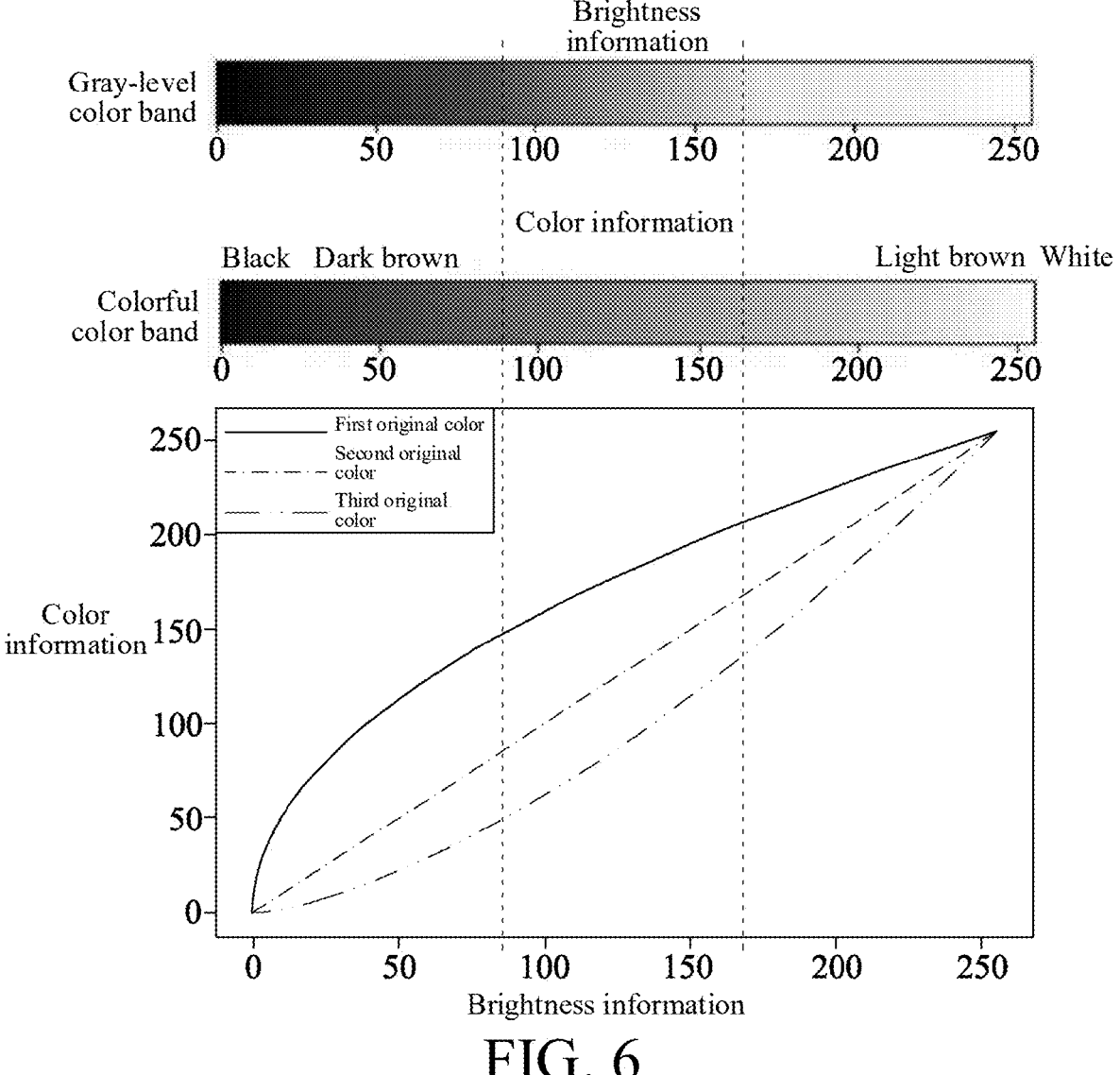
FIG. 6 is a schematic diagram of preset color conversion according to some other embodiments.

An output range of the limited output function $f(\ )$ of the conversion function is within values 0 to 255. The limited output function $f(\ )$ may be simply implemented by conditional expressions, for example: if (x>=255): x=255; if (x<=0): x=0; or be implemented by a rectified linear unit (ReLU), for example: $f(x)=\text{ReLU}(x)-\text{ReLU}(x-255)$. In some embodiments, The limited output function $f(\ )$ is not converted linearly, for example, the foregoing function $f(x)=\text{ReLU}(x)-\text{ReLU}(x-255)$ is multiplied by a nonlinear function g(x). According to some embodiments, the brightness ($I_{brightness}$) of the single pixel of the gray-level image may be converted into chrominance of the hues of the single pixel of the preset color image according to the following formulas 3-1, 3-2, and 3-3, and be summed up according to the formula 4:

$$I_R = 255 \times \left(\frac{I_{brightness}}{255}\right)^{\gamma_R} \qquad \text{(formula 3-1)}$$

$$I_G = 255 \times \left(\frac{I_{brightness}}{255}\right)^{\gamma_G} \qquad \text{(formula 3-2)}$$

$$I_B = 255 \times \left(\frac{I_{brightness}}{255}\right)^{\gamma_B} \qquad \text{(formula 3-3)}$$

$$I_{RGB} = I_R + I_G + I_B \qquad \text{(formula 4)}$$

where, $\gamma_R$ is a red gamma value, $\gamma_G$ is a green gamma value, and $\gamma_B$ is a blue gamma value. A gamma value of any hue affects a saturation speed of the hue line diagram. FIG. 6 shows a schematic diagram of preset color conversion according to some other embodiments. As shown by a curve (represented by a solid line) of a first original color, when a gamma value is between 0 and 1, the smaller the value (i.e., the larger a denominator of a fraction), the faster a chrominance value of the hue reaches saturation (i.e., approaches a value 255); as shown by a curve (represented by a single-dot chain line) of a second original color, when a gamma value is equal to 1, a chrominance value of the hue is equal to a brightness value; and as shown by a curve (represented by a double-dot chain line) of a third original color, when a gamma value is greater than 1, the larger the value, the later a chrominance value of the hue starts to be increased (i.e., approaches a value 0). Except for the curve with the gamma value of 1, the curves in FIG. 6 use the line $f(x)=0$ or $f(x)=255$ ($f(x)$ is the chrominance value) as an asymptote. Therefore, an output value of the conversion function is limited to the range of 0 to 255.

To facilitate understanding of the formula 3-1 to the formula 3-3, refer to the line diagram at the bottom of FIG. 6. By using an example in which the first original color is red, the second original color is green, and the third original color is blue in FIG. 6, if $\gamma_R$ is 0.5, $\gamma_G$ is 1, and $\gamma_B$ is 1.5, chrominance values of the original colors start to be increased when brightness values thereof are 0, and when the brightness values reach 100, a red chrominance value is about 160, a green chrominance value is 100, and a blue chrominance value is about 63. Therefore, a value of a brightness range of 0 to 50 of the original gray-level image is amplified as a value of a red chrominance range of 0 to 160, thereby increasing contrast among pixels of the image.

For the curve of the first original color in FIG. 6 (the solid line, in which the gamma value is greater than 0 and less than 1), the smaller the value thereof, the faster the chrominance value reaches saturation, in other words, in a low-brightness range, a small brightness change may cause a large chrominance change of the first original color; for the curve of the third original color (the double-dot chain line, in which the gamma value is greater than 1), the greater the value thereof, the later the chrominance value starts to be increased, in other words, in a high-brightness range, a small brightness change may cause a large chrominance change of the third original color; and for the curve of the second original color (the single-dot chain line, in which the gamma value is equal to 1), the chrominance value is equal to the brightness value, in other words, in all brightness ranges, brightness change information is retained in chrominance change information of the second original color. In this way, according to some embodiments, the gamma values of the three original colors are set to be greater than 1, equal to 1, and between 0 and 1 through the conversion function, so that the chrominance of the original colors can reflect higher contrast in response to different brightness ranges.

Figure 7:
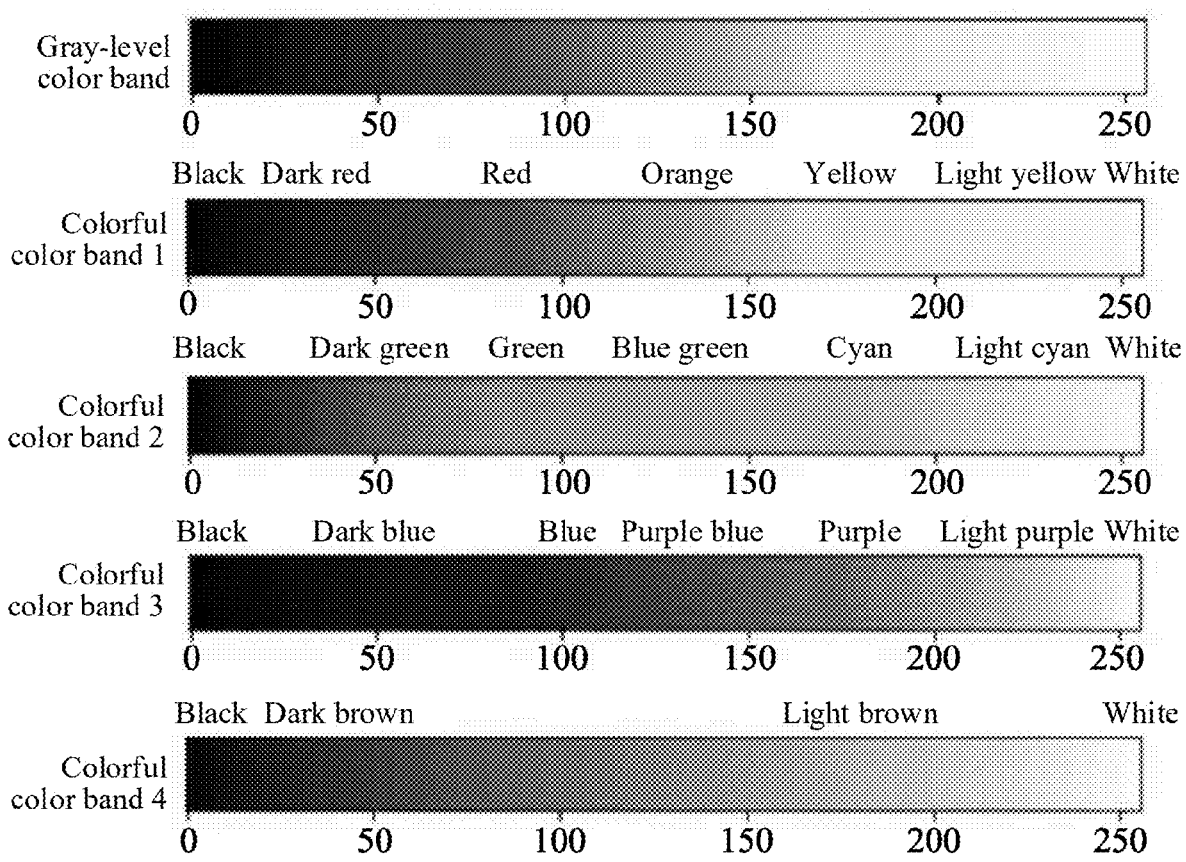
FIG. 7 is a schematic diagram of color band conversion according to some embodiments.

According to some embodiments, the gamma values may alternatively be set according to requirements, thereby affecting contrast changes of different brightness ranges. For example, to increase contrast in the low-brightness range, gamma values of one or more original colors may set to be between 0 and 1. For example, to increase contrast in the high-brightness range, gamma values of one or more original colors may set to be greater than 1. According to some embodiments, as mentioned above, the image recognition system 1 may adaptively adjust the gamma values of the conversion function according to the brightness information of the image data, to adjust contrast of the image data in response to a brightness change of an ambient light. According to some embodiments, to increase the contrast of the low-brightness range and the high-brightness range of the brightness information, the gamma value of the first original color may be set to 0.5, the gamma value of the second original color may be set to 1, and the gamma value of the third original color may be set to 1.5, Referring to FIG. 7 as a supplement together with FIG. 4, FIG. 7 is a schematic diagram of color band conversion according to some embodiments. In an embodiment of a colorful color band 1 (through linear conversion), the first original color (the solid line of FIG. 4) is set as red, the second original color (the single-dot chain line of FIG. 4) is set as green, and the third original color (the double-dot chain line of FIG. 4) is set as blue; in an embodiment of a colorful color band 2 (through linear conversion), the first original color (the solid line of FIG. 4) is set as green, the second original color (the single-dot chain line of FIG. 4) is set as blue, and the third original color (the double-dot chain line of FIG. 4) is set as red; in an embodiment of a colorful color band 3 (through linear conversion), the first original color (the solid line of FIG. 4) is set as blue, the second original color (the single-dot chain line of FIG. 4) is set as red, and the third original color (the double-dot chain line of FIG. 4) is set as green; in an embodiment of a colorful color band 4 (through nonlinear conversion), the first original color (the solid line of FIG. 6) is set as red, the second original color (the single-dot chain line of FIG. 6) is set as green, and the third original color (the double-dot chain line of FIG. 6) is set as blue; and in an embodiment of a gray-level color band, there is no any conversion. Differences from the colorful color band 1 to the colorful color band 3 lie in offsets of the three original colors, i.e., an order in which the three original colors start to be increased.

Referring to FIG. 7 as a supplement together with Table 1, Table 1 is a table of actual measurement results of an image recognition system according to some embodiments. Table 1 shows conversion functions corresponding to the colorful color band 1 to the colorful color band 4, gray-level image data is converted into a preset color image, a target recognition module 103 is configured to perform a back-test result after object recognition, and evaluation parameters in Table 1 are provided with mean average precision (mAP). The precision determining refers to capturing a threshold according to an intersection over union (IOU) of the object detection. When the IOU is higher than the threshold, the precision is determined as a true positive (TP). mAP@0.25, mAP@0.5, and mAP@0.75 in Table 1 respectively indicate mAP values obtained by thresholds 0.25, 0.5, and 0.75.

TABLE 1

| Table of actual measurement results of an image recognition system according to some embodiments | | | |
| --- | --- | --- | --- |
| Embodiment | mAP@0.25 | mAP@0.5 | mAP@0.75 |
| Colorful color band 1 | 0.69 | 0.62 | 0.28 |
| Colorful color band 2 | 0.68 | 0.63 | 0.27 |
| Colorful color band 3 | 0.65 | 0.62 | 0.24 |
| Colorful color band 4 | 0.73 | 0.67 | 0.30 |
| Gray-level color band | 0.66 | 0.61 | 0.28 |

For linear conversion, according to a preset color image obtained by the colorful color band 1 or the colorful color band 2, actual measurement results of image recognition of mAP@0.25, mAP@0.5, and mAP@0.75 are all better than an actual measurement result of image recognition of a gray-level image. According to a preset color image obtained by the colorful color band 1, the actual measurement results of image recognition of mAP@0.25 and mAP@0.75 are better than an actual measurement result of image recognition of a preset color image obtained by the colorful color band 2.

For nonlinear conversion, according to a preset color image obtained by the colorful color band 4, the actual measurement results of image recognition of mAP@0.25, mAP@0.5, and mAP@0.75 are all better than the actual measurement result of image recognition of the gray-level image, and are also better than the actual measurement results of image recognition of the preset color images obtained by the colorful color band 1, the colorful color band 2, and the colorful color band 3.

According to some embodiments, the conversion function selects a linear conversion function to reduce a calculation amount. The conversion function may use the embodiment of the colorful color band 1 to set offsets, i.e., an absolute value of the blue offset ($b_B$) of a negative value is greater than an absolute value of the green offset ($b_G$) of a negative value, and the absolute value of the green offset ($b_G$) of the negative value is greater than an absolute value of the red offset ($b_R$) of a negative value. According to some embodiments, the conversion function selects a nonlinear conversion function to increase the image contrast, thereby improving the recognition capability of the machine learning algorithm. The conversion function may use the embodiment of the colorful color band 4 to set gamma values, i.e., the blue gamma value ($\gamma_B$) is greater than the green gamma value ($\gamma_G$), and the green gamma value ($\gamma_G$) is greater than the red gamma value ($\gamma_R$).

According to some embodiments, the conversion function may alternatively convert red color information $I_R$, green color information $I_G$, and blue color information $I_B$ of the RGB color space into brightness information $I_Y$, first chrominance information $I_U$, and second chrominance information $I_V$ of an YUV color space according to the following formula 5 and formula 6:

$$\begin{bmatrix} I_Y \\ I_U \\ I_V \end{bmatrix} = \begin{bmatrix} 0.299 & 0.587 & 0.114 \\ -0.169 & -0.331 & 0.5 \\ 0.5 & -0.419 & -0.081 \end{bmatrix} \begin{bmatrix} I_R \\ I_G \\ I_B \end{bmatrix} + \begin{bmatrix} 0 \\ 128 \\ 128 \end{bmatrix} \qquad \text{(formula 5)}$$

$$I_{YUV} = I_Y + I_U + I_V \qquad \text{(formula 6)}$$

The foregoing formulas convert the first color information $I_{RGB}$ into the second color information $I_{YUV}$, so that the first color information $I_{RGB}$ is further converted through another formula, and the image recognition system 1 is applied to various color spaces.

Figure 8:
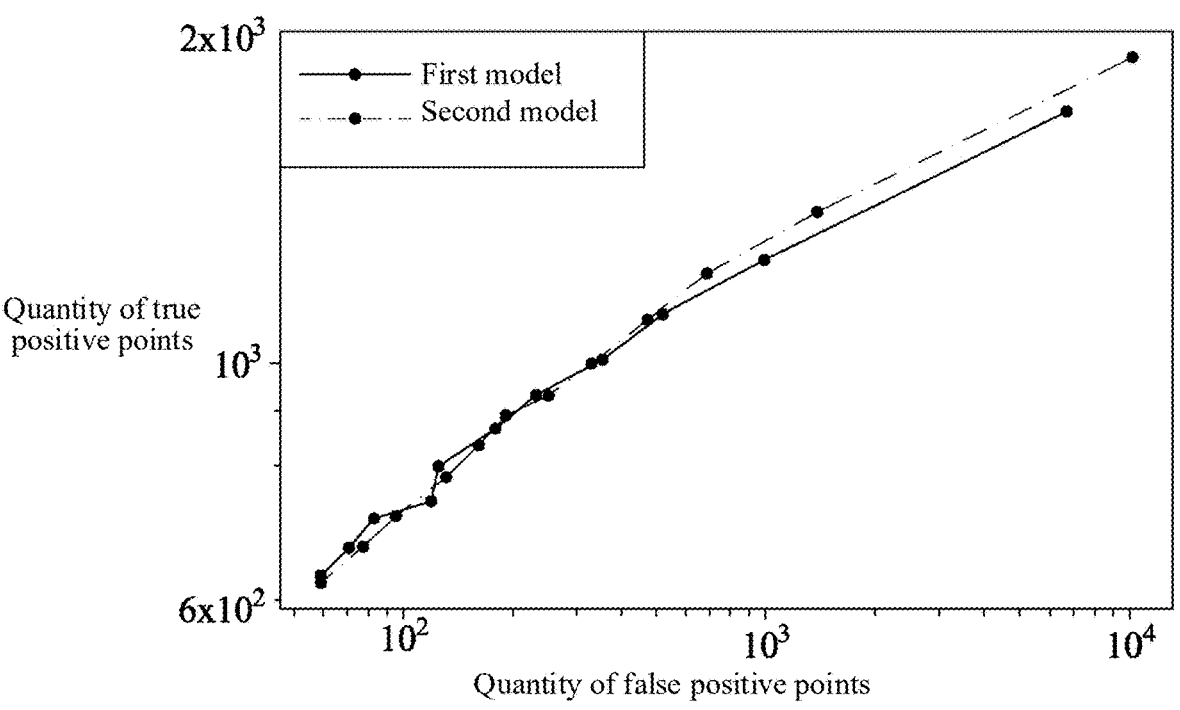
FIG. 8 is a diagram of a receiver operating characteristic (ROC) curve of the machine learning algorithm according to the first embodiment.

FIG. 8 is a diagram of a receiver operating characteristic (ROC) curve of the machine learning algorithm according to the first embodiment. To verify the image recognition system 1 according to some embodiments of the present invention, FIG. 8 shows the object recognition capability of the machine learning algorithm through the ROC curve. A horizontal axis of FIG. 8 is a quantity of false positive (FP) points, i.e., the machine learning algorithm determines that there is an object, and there are indeed a quantity of objects (correct recognition); and a vertical axis is a quantity of TP points, i.e., the machine learning algorithm determines that there is an object, and there is indeed no quantity of objects (wrong recognition). A solid line of FIG. 8 is a machine learning algorithm (a first model) generated by using an original color image and a gray-level image as a training set, and a single-dot chain line is a machine learning algorithm (a second model) generated by using an original color image and a preset color image (in which the original color image is converted into a gray-level image and then is converted into the preset color image) as a training set. During detection, a to-be-recognized original color image or gray-level image is directly inputted into the first model; and the to-be-recognized original color image is directly inputted into the second model, or the to-be-recognized gray-level image is converted into the preset color image, and then is inputted into the second model. In a case of a low-confidence threshold setting (which deviates to the upper right of the curve, for example, the quantity of TP points is set to over 103), the recognition capability of the second model is higher than that of the first model. In other words, when a machine learning model actively recognizes a large quantity of objects, the second model is obviously better than the first model. Therefore, according to some embodiments, an original image marked by a training tag is converted into a gray-level image, and then the gray-level image is converted into a preset color image for training the second model. In this way, a developer can convert color images in the existing marked databases to generate a training set of the second model, thereby eliminating the labor costs of artificially marking gray-level images, and improving the object recognition capability of the machine learning algorithm.

Figure 9:
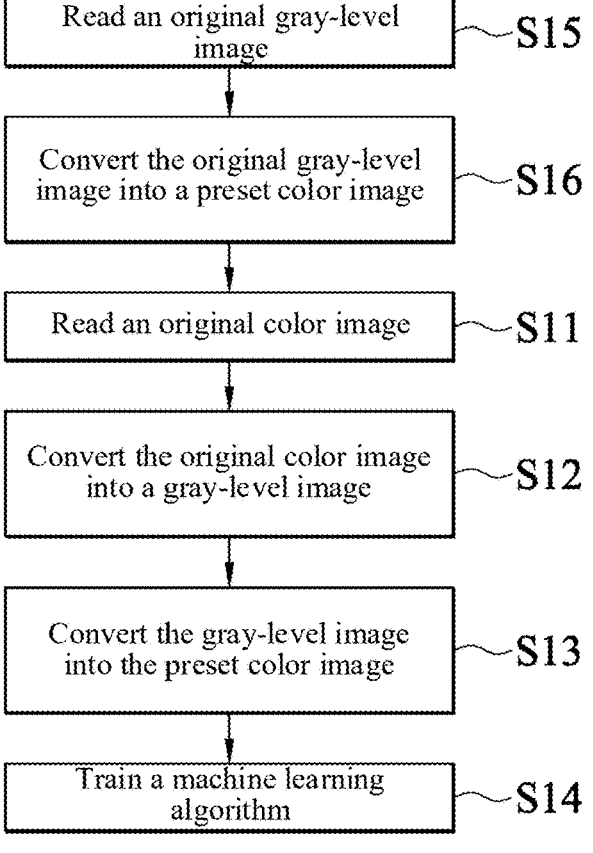
FIG. 9 is a flowchart of training a machine learning algorithm according to a second embodiment.
Figure 10:
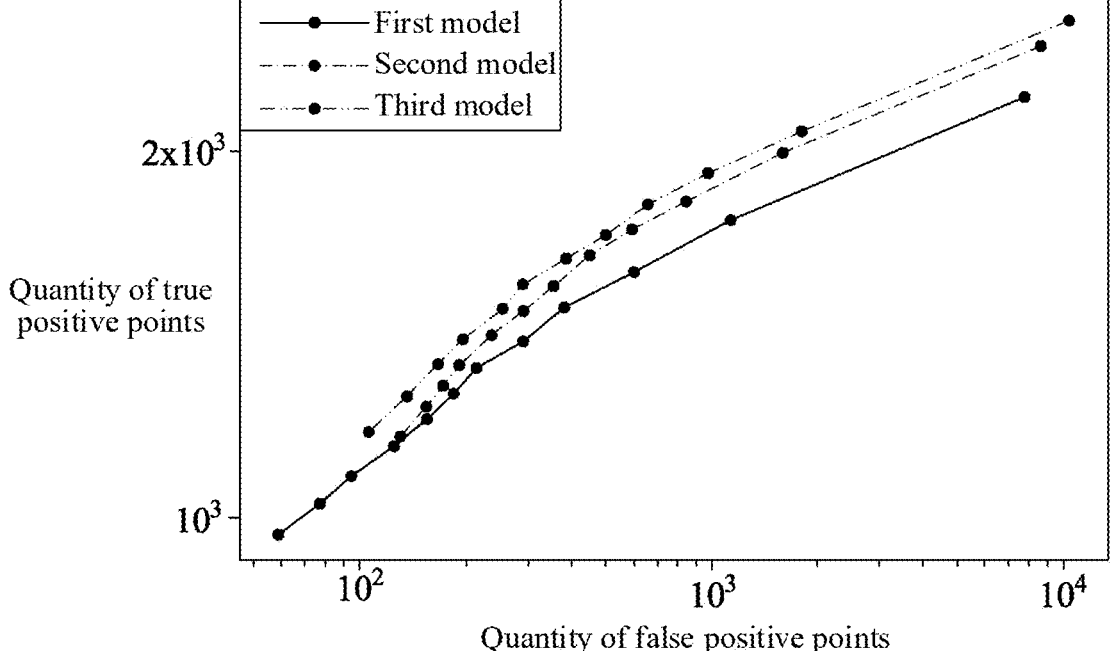
FIG. 10 is a diagram of an ROC curve of the machine learning algorithm according to the second embodiment.

FIG. 9 is a flowchart of training a machine learning algorithm according to a second embodiment. FIG. 10 is a diagram of an ROC curve of the machine learning algorithm according to the second embodiment. Referring to FIG. 9 first, a color conversion module 102 reads an original color image (step S11), and converts the original color image into a gray-level image (step S12). Then, the gray-level image is converted into a preset color image (step S13), and forms a training set together with training tags marked in images, to train a state of a machine learning algorithm (step S14). A second model may be obtained according to the foregoing steps. According to some embodiments, a small quantity of artificially marked original gray-level images are used, for example, an image photographed by an infrared camera is used for object marking. A color conversion module 102 reads an original gray-level image (step S15), and converts the original gray-level image into a preset color image (step S16). Then, the preset color image forms a training set together with training tags marked in images, to train the state of the machine learning algorithm (step S14). A third model may be obtained according to the foregoing steps.

Referring to FIG. 10 again, a solid line of FIG. 10 is a machine learning algorithm (a first model) generated by using an original color image and a gray-level image as a training set, a single-dot chain line is a machine learning algorithm (a second model) generated by using an original color image and a preset color image (in which the original color image is converted into a gray-level image and then is converted into the preset color image) as a training set, and a double-dot chain line is a machine learning algorithm (a third model) generated by using an original color image and a preset color image (in which the original color image is converted into a gray-level image and then is converted into the preset color image, and the original gray-level image is converted into the preset color image) as a training set. During detection, a to-be-recognized original color image or gray-level image is directly inputted into the first model; and the to-be-recognized original color image is directly inputted into the second model, or the to-be-recognized gray-level image is converted into the preset color image, and then is inputted into the second model; and the to-be-recognized original color image is directly inputted into the third model, or the to-be-recognized gray-level image is converted into the preset color image, and then is inputted into the third model. As shown in FIG. 10, the recognition capability of the second model is higher than that of the first model, and the recognition capability of the third model is higher than that of the second model.

In conclusion, according to some embodiments, the image recognition system 1 converts a gray-level image into a preset color image, which improves the object recognition capability of the machine learning algorithm, and reduces resource consumption during operation of the machine learning algorithm. According to some embodiments, the training method for the image recognition system 1 converts an original color image into a gray-level image, and then converts the gray-level image into a preset color image. In this way, a marked color image database can be used as a training set, to generate a machine learning algorithm that can be used to recognize a gray-level image.

What is claimed is:

1. An image recognition system, comprising:
a color conversion module, configured to convert a gray-level image into a preset color image according to a conversion function, the gray-level image comprises a singular channel solely coded for a brightness information, and the conversion function is used for converting the brightness information of the gray-level image into a red color information, a green color information, and a blue color information; and
a target recognition module, comprising a machine learning algorithm, wherein the machine learning algorithm comprises a plurality of functions and a plurality of parameters, the machine learning algorithm receives the preset color image, and outputs a recognition result according to the functions and the parameters, the recognition result comprising an existent target or a null target,
wherein the gray-level image comprises brightness information, the conversion function is used for converting the brightness information into first color information, and the conversion function is:

$$I_R = f(W_R \times I_{brightness} + b_R)$$

$$I_G = f(W_G \times I_{brightness} + b_G)$$

$$I_B = f(W_B \times I_{brightness} + b_B)$$

$$I_{RGB} = I_R + I_G + I_B$$

wherein $I_{brightness}$ is the brightness information, $W_R$ is a red weight, $W_G$ is a green weight, $W_B$ is a blue weight, $b_R$ is a red offset, $b_G$ is a green offset, $b_B$ is a blue offset, $I_R$ is the red color information, $I_G$ is the green color information, $I_B$ is the blue color information, $I_{RGB}$ is the first color information, and $f(\ )$ is a limited output function, an output range of the limited output function being between a value 0 and a value 255, and
wherein the red weight $W_R$, the green weight $W_G$, and the blue weight $W_B$ are 3, the red offset $(b_R)$ is 0, the green offset $(b_G)$ is $-1 \times 255$, and the blue offset $(b_B)$ is $-2 \times 255$.

2. The image recognition system according to claim 1, wherein the blue offset $(b_B)$, the green offset $(b_G)$, and the red offset $(b_R)$ are negative values, an absolute value of the blue offset $(b_B)$ is greater than an absolute value of the green offset $(b_G)$, and the absolute value of the green offset $(b_G)$ is greater than an absolute value of the red offset $(b_R)$.

3. The image recognition system according to claim 2, wherein a difference between the green offset $(b_G)$ and the red offset $(b_R)$ is the same as a difference between the blue offset $(b_B)$ and the green offset $(b_G)$.

4. The image recognition system according to claim 1, wherein the limited output function $f(\ )$ is:

$$f(x) = ReLU(x) - ReLU(x - 255)$$

wherein ReLU is a rectified linear unit, and x is an input value of the limited output function $(f)$.

5. The image recognition system according to claim 1, further comprising: converting the first color information into second color information according to the following formulas:

$$\begin{bmatrix} I_Y \\ I_U \\ I_V \end{bmatrix} = \begin{bmatrix} 0.299 & 0.587 & 0.114 \\ -0.169 & -0.331 & 0.5 \\ 0.5 & -0.419 & -0.081 \end{bmatrix} \begin{bmatrix} I_R \\ I_G \\ I_B \end{bmatrix} + \begin{bmatrix} 0 \\ 128 \\ 128 \end{bmatrix}$$

$$I_{YUV} = I_Y + I_U + I_V$$

wherein $I_Y$ is the brightness information, $I_U$ is first chrominance information, $I_V$ is second chrominance information, and $I_{YUV}$ is the second color information.

6. The image recognition system according to claim 1, wherein the gray-level image comprises brightness information, the conversion function is used for converting the brightness information into first color information, and the conversion function is:

$$I_R = 255 \times \left( \frac{I_{brightness}}{255} \right)^{\gamma_R}$$

$$I_G = 255 \times \left( \frac{I_{brightness}}{255} \right)^{\gamma_G}$$

$$I_B = 255 \times \left( \frac{I_{brightness}}{255} \right)^{\gamma_B}$$

$$I_{RGB} = I_R + I_G + I_B$$

wherein $I_{brightness}$ is the brightness information, $I_R$ is the red color information, $I_G$ is the green color information, $I_B$ is the blue color information, $\gamma_R$ is a red gamma value, $\gamma_G$ is a green gamma value, $\gamma_B$ is a blue gamma value, and $I_{RGB}$ is the first color information.

7. The image recognition system according to claim 6, wherein the blue gamma value $(\gamma_B)$ is greater than the green gamma value $(\gamma_G)$, and the green gamma value $(\gamma_G)$ is greater than the red gamma value $(\gamma_R)$.

8. The image recognition system according to claim 7, wherein a difference between the green gamma value $(\gamma_G)$ and the red gamma value $(\gamma_R)$ is the same as a difference between the blue gamma value $(\gamma_B)$ and the green gamma value $(\gamma_G)$.

9. The image recognition system according to claim 7, wherein the red gamma value $(\gamma_R)$ is between 0 and 1, the green gamma value $(\gamma_G)$ is 1, and the blue gamma value $(\gamma_B)$ is greater than 1.

10. The image recognition system according to claim 1, further comprising a color recognition module, the color recognition module being configured to:

receive image data;

determine whether the image data is the gray-level image according to the image data or a photographing parameter; and transmit the gray-level image to the target recognition module.

11. The image recognition system according to claim 10, wherein when the color recognition module determines that the image data is not the gray-level image, the color recognition module is further configured to transmit the image data to the target recognition module, and the machine learning algorithm is further used for receiving the image data, and outputting the recognition result according to the functions and the parameters.

12. The image recognition system according to claim 1, wherein the image recognition system is a gray-level image recognition system, configured to control a photographing module to capture the gray-level image in an infrared light sensing mode, and transmit the gray-level image to the color conversion module.

* * * * *